United States Patent
Heorhiadi et al.

(10) Patent No.: US 9,842,045 B2
(45) Date of Patent: Dec. 12, 2017

(54) FAILURE RECOVERY TESTING FRAMEWORK FOR MICROSERVICE-BASED APPLICATIONS

(71) Applicant: International Business Machines Corporation, Armonk, NY (US)

(72) Inventors: Viktor Heorhiadi, Durham, NC (US); Hani T. Jamjoom, Cos Cob, CT (US); Shriram Rajagopalan, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 15/048,102

(22) Filed: Feb. 19, 2016

(65) Prior Publication Data

US 2017/0242784 A1    Aug. 24, 2017

(51) Int. Cl.
G06F 11/00 (2006.01)
G06F 11/36 (2006.01)

(52) U.S. Cl.
CPC ...... *G06F 11/3692* (2013.01); *G06F 11/3684* (2013.01); *G06F 11/3688* (2013.01)

(58) Field of Classification Search
USPC ........................................................ 714/38.1
See application file for complete search history.

(56) References Cited

U.S. PATENT DOCUMENTS 8,813,065 B2  8/2014 Zygmuntowicz et al.
2008/0215925 A1* 9/2008 Degenaro ............. G06F 11/263
                                                              714/41

(Continued)

FOREIGN PATENT DOCUMENTS

CN    105162884 A    12/2015
EP      2254310 A2   11/2010

OTHER PUBLICATIONS

M.K. Aguilera et al., "Failure Detection and Consensus in the Crash-Recovery Model," Distributed Computing, Apr. 2000, pp. 99-125, vol. 13, No. 2.

(Continued)

*Primary Examiner* — Sarai Butler
(74) *Attorney, Agent, or Firm* — Keivan Razavi; Ryan, Mason & Lewis, LLP

(57) ABSTRACT

Systems and methods are provided for resiliency testing microservice-based applications. For example, a method for resiliency testing an application includes receiving a test script that specifies a failure scenario in a distributed microservice-based application comprising a plurality of microservices, and an asserted behavioral expectation of at least one microservice of the distributed microservice-based application in response to the specified failure scenario. The specified failure scenario is translated into fault injection rules. The fault injection rules are utilized to execute fault injection operations on messages that are exchanged between at least a first microservice and a second microservice of the distributed microservice-based application, to stage the specified failure scenario during the failure recovery testing of the distributed microservice-based application. The asserted behavioral expectation of the at least one microservice is compared with an observed behavior of the at least one microservice in response to the execution of the fault injection operations.

20 Claims, 7 Drawing Sheets

(56) References Cited

U.S. PATENT DOCUMENTS

| | | | |
|---|---|---|---|
| 2010/0287412 A1* | 11/2010 | Cha | G06F 11/3688 714/35 |
| 2010/0299437 A1 | 11/2010 | Moore | |
| 2012/0278127 A1* | 11/2012 | Kirakosyan | H04L 67/02 705/7.29 |
| 2013/0246853 A1* | 9/2013 | Salame | G06F 11/079 714/37 |
| 2013/0262938 A1* | 10/2013 | Schmitt | G06F 11/085 714/48 |
| 2013/0326487 A1 | 12/2013 | Yousouf et al. | |
| 2014/0201583 A1* | 7/2014 | Thomas | G01R 31/3177 714/727 |
| 2015/0081243 A1 | 3/2015 | Ganai et al. | |
| 2015/0169432 A1 | 6/2015 | Sinyagin et al. | |
| 2015/0212923 A1* | 7/2015 | Sugiyama | G06F 11/3644 714/38.1 |
| 2015/0254171 A1 | 9/2015 | Harden et al. | |
| 2015/0293824 A1* | 10/2015 | Peters | G11C 16/3445 714/6.11 |

OTHER PUBLICATIONS

M. Chow et al., "The Mystery Machine: End-to-End Performance Analysis of Large-Scale Internet Services," 11th USENIX Symposium on Operating Systems Design and Implementation (OSDI), Oct. 6-8, 2014, pp. 217-231.
S. Dawson et al., "Testing of Fault-Tolerant and Real-Time Distributed Systems via Protocol Fault Injection," IEEE 26th Annual International Symposium on Fault-Tolerant Computing (FTCS), Jun. 25-27, 1996, pp. 404-414, Sendai, Japan.
Roy Thomas Fielding, "Architectural Styles and the Design of Network-Based Software Architectures," University of California, Ph.D. Dissertation, 2000, 180 pages.
H.S. Gunawi et al., "Fate and Destini: A Framework for Cloud Recovery Testing," 8th USENIX Conference on Networked Systems Design and Implementation (NSDI), Mar. 2011, pp. 238-252.
S. Han et al., "DOCTOR: An Integrated Software Fault Injection Environment," International Computer Performance and Dependability Symposium (IPDS), Apr. 24-26, 1995, pp. 204-213, Erlangen, Germany.
P. Joshi et al., "PreFail: A Programmable Tool for Multiple-Failure Injection," ACM International Conference on Object Oriented Programming Systems Languages and Applications, (OOPSLA), Oct. 22-27, 2011, pp. 171-188, vol. 46, No. 10.
L. Juszczyk et al., "Script-Based Generation of Dynamic Testbeds for SOA," IEEE International Conference on Web Services (ICWS), Jul. 5-10, 2010, pp. 195-202.
N.P. Kropp et al., "Automated Robustness Testing of Off-the-Shelf Software Components," 28th Annual International Symposium on Fault-Tolerant Computing (FTCS), Jun. 23-25, 1998, pp. 230-240, Munich, Germany.
J. Yang et al., "MoDist: Transparent Model Checking of Unmodified Distributed Systems," 6th USENIX Symposium on Networked Systems Design and Implementation (NSDI), Apr. 22, 2009, pp. 213-228.
P. Reynolds et al., "Pip: Detecting the Unexpected in Distributed Systems," 3rd Symposium on Networked Systems Design & Implementation (NSDI), May 2006, pp. 115-128.
B.H. Sigelman et al., "Dapper, a Large-Scale Distributed Systems Tracing Infrastructure," Google Technical Report, Apr. 2010, 14 pages.
Richard Cooper, "BBC Online Outage on Saturday Jul. 19, 2014," http://www.bbc.co.uk/blogs/internet/entries/a37b0470-47d4-3991-82bb-a7d5b8803771, Jul. 22, 2014, 1 page.
CircleCI.com, "DB Performance Issue—Incident Report for CircleCI," http://status.circleci.com/incidents/hr0mm9xmm3x6, Jul. 14, 2015, 7 pages.
Dockercon, "Enabling Continuous (Food) Delivery at GrubHub," https://dockercon2015.sched.org/event/39SB/enabling-continuous-food-delivery-at-grubhub, Jun. 22, 2015, 3 pages.
Zack Bloom, "How We Deploy 300 Times a Day," HubSpot Product and Engineering Blog, http://product.hubspot.com/blog/how-we-deploy-300-times-a-day, Nov. 18, 2013, 14 pages.
Dockercon, "Enabling Microservices@Orbitz," https://dockercon2015.sched.org/event/39S6/enabling-microservices-orbitz, Jun. 22, 2015, 3 pages.
The Joyent Team, "Postmortem for Jul. 27 Outage of the Manta Service," https://www.joyent.com/blog/manta-postmortem-07-27-2015, Aug. 3, 2015, 11 pages.
Igor Serebryany, "SmartStack: Service Discovery in the Cloud," Open Source, http://nerds.airbnb.com/smartstack-service-discovery-cloud/, Oct. 23, 2013, 10 pages.
Andrew Montalenti, "Kafkapocalypse: A Postmortem on Our Service Outage," http://blog.parsely.com/post/1738/kafkapocalypse/, Mar. 31, 2015, 14 pages.
David Poblador, "Incident Management at Spotify," https://labs.spotify.com/2013/06/04/incident-management-at-spotify/, Jun. 4, 2013, 7 pages.
Stackdriver.com, "Report on Oct. 23 Stackdriver Outage," http://www.stackdriver.com/post-mortem-october-23-stackdriver-outage/, Oct. 31, 2013, 9 pages.
Twilio.com, "Billing Incident Post-Mortem: Breakdown, Analysis and Root Cause," https://www.twilio.com/blog/2013/07/billing-incident-post-mortem-breakdown-analysis-and-root-cause.html, Jul. 23, 2013, 10 pages.
Chris Aniszczyk, "Distributed Systems Tracing with Zipkin," https://blog.twitter.com/2012/distributed-systems-tracing-with-zipkin, Jun. 7, 2012, 1 page.
Wordpress.org, "ElasticPress Plugin: Integrate Elasticsearch with WordPress," https://wordpress.org/plugins/elasticpress/, Mar. 3, 2016, 3 pages.
Elastic.co, "An Introduction to the ELK Stack," https://www.elastic.co/webinars/introduction-elk-stack, Feb. 18, 2016, 2 pages.
Github.com, "Hystrix: Latency and Fault Tolerance for Distributed Systems," https://github.com/Netflix/Hystrix/, 2013, 5 pages.
C. Bennett et al., "Chaos Monkey Released Into the Wild," http://techblog.netflix.com/2012/07/chaos-monkey-released-into-wild.html, Jul. 30, 2012, 7 pages.
Unirest.io, "Unirest for Ruby—Simplified, Lightweight HTTP Request Library," http://unirest.io/ruby.html, Feb. 18, 2016, 6 pages.
Github, "Chaos Monkey," Netflix/Simian Army, https://github.com/Netflix/SimianArmy/wiki/Chaos-Money, Jan. 5, 2015, 1 page.
S. Daya et al., "Microservices from Theory to Practice: Creating Applications in IBM Bluemix Using the Microservices Approach," IBM International Technical Support Organization, Aug. 2015, 170 pages.
M. Fowler et al., "Microservices," http://martinfowler.com/articles/microservices.html, Mar. 25, 2014, 16 pages.
List of IBM Patents or Patent Applications Treated as Related.

* cited by examiner

TABLE 2

| CALL | DESCRIPTION |
|------|-------------|
| QUERIES (400) | |
| GetRequests (Src, Dst, ID = "*") | Return all observed requests between Src and Dst services filtered by the request ID pattern. |
| GetReplies (Src, Dst, ID = "*") | Return all observer replies between Src and Dst services filtered by the request ID pattern. |
| NumRequests (RList, tdelta, withRule) | Compute the number of requests in the given request (or reply list). Optional tdelta limits the time window for which the computation is performed. withRule is a boolean parameter specifying whether primitive actions (such as Drop or Delay) should be taken into account |
| ReplyLatency (RList, withRule) | Compute the time for replies to arrive for each reply in RList. withRule is a boolean (see above) |
| BASE ASSERTIONS (402) | |
| NoRequests (RList, tdelta, withRule) | Check that no requests have been sent within time window tdelta. withRule is a boolean (see above) |
| CheckStatus (RList, Status, NumMatch, withRule) | For given request list RList, check that at least NumMatch requests have returned status Status. withRule is a boolean (see above) |
| RequestRate (RList) | Compute and return the rate of requests (req/sec) in the given list RList |
| Combine (RList, (Assertion, args)...) | Combine multiple base assertions, wherein each assertion "consumes" portion of requests when it is True, in the style of a state machine. |
| PATTERN CHECKS (404) | |
| HasRateLimiting (Src, Dst, MaxRate) | Check that Src limits the requests sent to Dst to at most MaxRate per second |
| HasTimeouts (Src, MaxLatency) | Check that Src replies to it's upstream services within MaxLatency |
| HasBoundedRetries (Src, Dst, MaxTries) | Check that Src implements a bounded retry pattern when making API calls to Dst |
| HasCircuitBreaker (Src, Dst, Threshold, tdelta, SuccessThreshold) | Check that Src implements a circuit breaker when making API calls to Dst. Threshold failed requests triggers absence of calls for tdelta. SuccessThreshold closes the circuit breaker. |
| HasBulkHead (Src, SlowDst, Rate) | Check that a service has a bulkhead—ensures that service request rate is at least Rate to dependents other than SlowDst |

FAILURE RECOVERY TESTING FRAMEWORK FOR MICROSERVICE-BASED APPLICATIONS

TECHNICAL FIELD

The field generally relates to network computing and, in particular, to systems and methods for resiliency testing of cloud-based distributed applications.

BACKGROUND

The cloud computing model has emerged as the de facto paradigm for providing a wide range of services in the IT industry such as infrastructure, platform, and application services. As a result, various vendors offer cloud-based solutions to optimize the use of their data centers. Modern cloud-based applications, irrespective of scale, are distributed, heterogeneous and can evolve rapidly in a matter of hours to respond to user feedback. This agility is enabled by the use of a fine-grained service-oriented architecture, referred to as a microservice architecture. A microservice is a web service that serves a single purpose, and exposes a set of APIs to other microservices, which collectively implement a given application. Each microservice of a microservice-based application is developed, deployed and managed independent of other constituent microservices of the microservice-based application. New features and updates to a microservice are continuously delivered in a rapid, incremental fashion, wherein newer versions of microservices are continually integrated into a production deployment. Microservice-based applications developed in this manner are extremely dynamic as they can be updated and deployed hundreds of times a day.

Microservice-based applications, running in the cloud, should be designed for, and tested against, failures. In the past, many popular highly available Internet services (which are implemented as a microservice-based application) have experienced failures and outages (e.g., cascading failures due to message bus overload, cascading failures due to database overload, cascading failures due to degradation of core internal services, database failures, etc.). The post-mortem reports of such outages revealed missing or faulty failure handling logic, with an acknowledgment that unit and integration testing are insufficient to catch bugs in the failure recovery logic.

In this regard, microservice-based applications should be subjected to resiliency testing, which involves testing the application's ability to recover from failure scenarios commonly encountered in the cloud, for example. However, splitting a monolithic application into microservices creates a dynamic software development environment that poses some key challenges to resiliency testing due to the runtime heterogeneity of the different microservices and the volatility of the code base. Indeed, microservice applications are typically polyglot, wherein application developers write individual microservices in the programming language they are most comfortable with. Moreover, a frequent experimentation and incremental software update delivery model results in microservices being constantly updated and redeployed, leaving the code base in a constant state of flux. This runtime heterogeneity and high code churn of microservices makes resiliency testing a microservice-based application highly problematic and non-trivial.

SUMMARY

Embodiments of the invention include systems and methods for resiliency testing microservice-based applications.

For example, one embodiment includes a method for resiliency testing an application. The method includes receiving a test script that specifies (i) a failure scenario in a distributed microservice-based application comprising a plurality of microservices; and (ii) an asserted behavioral expectation of at least one microservice of the distributed microservice-based application in response to the specified failure scenario. The specified failure scenario is translated into fault injection rules. The fault injection rules are utilized to execute fault injection operations on messages that are exchanged between at least a first microservice and a second microservice of the distributed microservice-based application, to stage the specified failure scenario during the failure recovery testing of the distributed microservice-based application. The asserted behavioral expectation of the at least one microservice is compared with an observed behavior of the at least one microservice in response to the execution of the fault injection operations.

Another embodiment includes a system, wherein the system includes a computing node which comprises system memory to store program instructions, and at least one processor configured to execute the program instructions to implement a control plane. The control plane is configured for resiliency testing of distributed-microservices applications. The control plane comprises a translation module, a failure orchestration module, and an assertion checker module. The translation module is configured to receive a test script that specifies (i) a failure scenario in a distributed microservice-based application comprising a plurality of microservices; and (ii) an asserted behavioral expectation of at least one microservice of the distributed microservice-based application in response to the specified failure scenario, and translate the specified failure scenario into fault injection rules. The failure orchestration module is configured to utilize the fault injection rules to execute fault injection operations on messages that are exchanged between at least a first microservice and a second microservice of the distributed microservice-based application, to stage the specified failure scenario during the failure recovery testing of the distributed microservice-based application. The assertion checker module is configured to compare the asserted behavioral expectation of the at least one microservice with an observed behavior of the at least one microservice in response to the execution of the fault injection operations.

Other embodiments of the invention will be described in the following detailed description, which is to be read in conjunction with the accompanying drawings.

DESCRIPTION OF THE DRAWINGS

FIG. 4 is a table which illustrates an interface that is exposed by an assertion checker module according to an embodiment of the invention.

DETAILED DESCRIPTION

Figure 1:
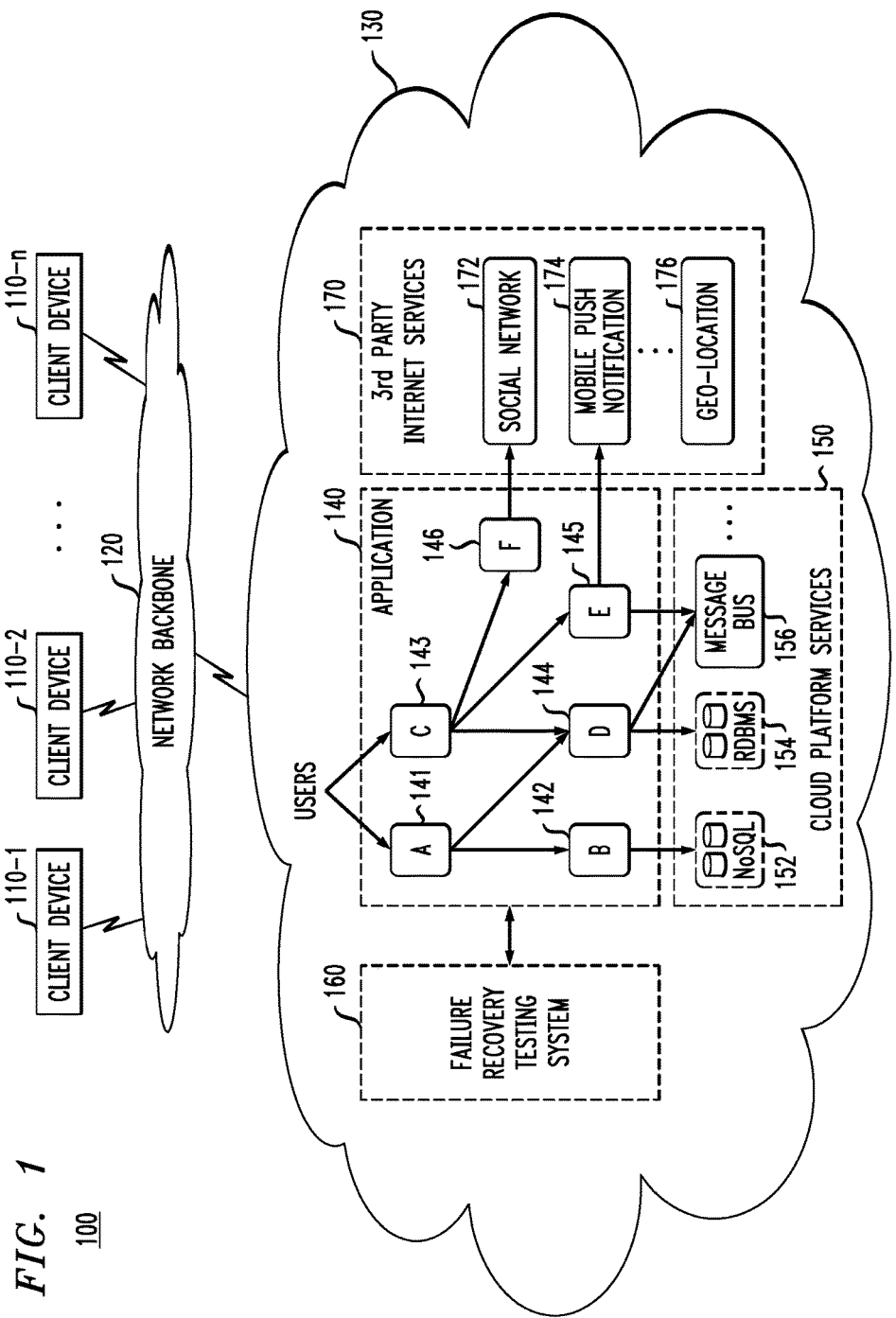
FIG. 1 illustrates a computing system which implements a failure recovery testing system for a microservice-based application, according to an embodiment of the invention.

Embodiments of the invention will now be discussed in further detail with regard to systems and methods for failure recovery testing of microservice-based applications. In general, systems and method for testing the resiliency of microservice-based applications are based on an observation that a microservice-based application relies on standard message exchange patterns for inter-service communication between the constituent microservices over a network. In this regard, in accordance with embodiments of the invention, techniques are provided to recreate or otherwise stage common application-level failure scenarios by intercepting and manipulating messages that are exchanged at the network layer between two or more constituent microservices of a microservice-based application.

There are various challenges for resiliency testing of a microservice-based application. While a microservice-based application is fundamentally a distributed application, a microservice-based application differs from distributed file systems, distributed databases, distributed co-ordination services, etc. The latter group of applications have complex distributed state machines with a large number of possible state transitions. While existing tools for resiliency testing cater to the needs of these traditional low-level distributed applications, we find these tools to be unsuitable for use in web/mobile focused microservice applications, due to various challenges, as follows.

For example, a distributed microservice-based application can be composed of various microservices written in different programming languages, wherein such microservices can use any database of their choice, to persist their state. Microservices may also be rewritten at any time using a different programming language, as long as they expose the same set of APIs to other services. Consequently, approaches that rely on language specific capabilities (e.g., dynamic code injection in Java) for fault injection and verification are not feasible in such heterogeneous environments, as runtime heterogeneity does not support these capabilities. In addition, microservices are autonomously managed by independent teams, whereby new versions of microservices can be deployed 10-100 times a day, independent of other services. Exhaustive checkers cannot keep up with this time scale. Randomized failure injection, on the other hand, does not provide the ability to test against specific failure scenarios that pertain to a set of recently deployed microservices.

To address the challenges in resiliency testing of a polyglot distributed application as described herein, exemplary embodiments of the invention provide resiliency testing frameworks that are agnostic of an application's platform and logic. These testing frameworks take into consideration that irrespective of runtime heterogeneity, all communication between constituent microservices of a microservice-based application occurs entirely over a network. The constituent microservices work in coalition to generate a response to an end user's request. Accordingly, based on the reliance of the constituent microservices to communicate through messages on a network, embodiments of the invention implement resiliency testing protocols that can emulate different types of application-level failures by intercepting and manipulating network messages/interactions between communicating microservices. For example, a network partition can be created by dropping all packets between two groups of microservices, while allowing communication within each group.

Furthermore, despite the rapid rate at which a microservice-based application evolves in a daily fashion (high code volatility), the interaction between constituent microservices of the microservice-based application can be characterized using a few simple, standard patterns such as request-response (e.g., REST over HTTP), publish-subscribe using lightweight messaging systems, etc. The semantics of these application layer transport protocols and the interaction patterns are well understood. In this regard, it is possible to elicit a failure-related reaction from any microservice, irrespective of its application logic or runtime, by manipulating these interactions directly. For example, an overload of a first microservice (e.g., overloaded server) can be staged by intercepting requests (e.g., client HTTP requests) from a second microservice to the first microservice and returning an HTTP status code 503 "Service Unavailable" (or other error message) to the second microservice.

We leverage these fundamental observations to implement systems and methods for resiliency testing of microservice-based applications, wherein such systems and methods for resiliency testing are essentially network-oriented, and independent of the application code and runtime. As previously noted, in a microservice-based application, a response to a user request is a composition of responses from different microservices that communicate over a network. In one embodiment of the invention, a failure recovery testing system implements a fault model that is based on application-level failures that can be observed from the network by other microservices. A failure recovery testing system injects faults into the network communication channel between microservices to stage/emulate various failure modes including fail-stop/crash failures, performance/omission failures, and crash-recovery failures, which are the most common types of failures encountered by applications in modern-day cloud deployments. From the perspective of a microservice making an API call, failures in a target microservice or the network manifests in the form of, e.g., delayed responses, error responses (e.g., HTTP 404, HTTP 503), invalid responses, connection timeouts, a failure to establish a connection, etc. In this regard, various failure incidents such as: (i) cascading failure due to message bus overload; (ii) cascading failures due to database overload (iii) cascading failure due to degradation of a core internal service and (iv) database failures, etc. can be emulated by a set of failure modes supported by a failure recovery testing system according to an embodiment of the invention.

FIG. 1 illustrates a computing system which implements a failure recovery testing system for a microservice-based application, according to an embodiment of the invention. More specifically, FIG. 1 illustrates a computing network 100 comprising a plurality of client devices 110-1, 110-2, . . . , 110-n (collectively referred to as client devices 110), a network 120, and a cloud computing system 130. The cloud computing system 130 comprises a microservice-based application 140, a cloud computing platform 150, a failure recovery testing system 160, and a plurality of third-party web services 170. The client devices 110 may comprise, for example, desktop computers, laptop computers, PDAs (personal digital assistants), smart phones, electronic tablets, or other types of computing devices that enable users and other entities to access the cloud computing system 130 via the network 120.

The network 120 may comprise, for example, a global computer network such as the Internet, a wide area network (WAN), a local area network (LAN), a satellite network, a telephone or cable network, a cellular network, a wireless network such as Wi-Fi or WiMAX, or various portions or combinations of these and other types of networks (e.g., Internet Protocol (IP) based networks). The network 120 comprises intermediate points (such as routers, switches, etc.), gateways, and other elements that form a network backbone to establish communication paths and enable communication between network endpoints. The cloud computing system 130 may comprise a private or public cloud computing system. The various components of the cloud computing system 130 can communicate with each other over the network 120 and/or LANs and WANs that are part of the cloud computing system 130.

In the example embodiment of FIG. 1, the application 140 is a distributed microservice-based application which comprises an aggregation of a plurality of different microservices including, for example, a first microservice 141 (or Service A), a second microservice 142 (or Service B), a third microservice 143 (or Service C), a fourth microservice 144 (or Service D), a fifth microservice 145 (or Service E), and a sixth microservice 146 (or Service F). The microservices 141-146 comprises a collection of distributed fine-grained web services, such as REST-based web services. The microservices 141-146 interact with each other over a communications network using standard application protocols such as HTTP and communication patterns, request-response, publish-subscribe, etc., the semantics of which are well understood. The microservices 141-146 are loosely-coupled with one another such that each microservice can be updated and deployed independent of other microservices of the application 140 as long as the APIs they expose are backward compatible. This loose-coupling is achieved, for example, using standard application protocols such as HTTP to facilitate easy integration with other microservices.

In one embodiment of the invention, the application 140 provides software services such as web services or mobile computing services to end users using the collection of fine-grained microservices 141-146. The application 140 leverages various managed services provided by the hosting cloud computing platform 150 including, for example, managed databases (e.g., NoSQL database 152, RDBMS database 154), a message bus 156 (or message queues), and other types of services such as data analytics, etc. The application 140 also integrates with one or more of the third-party web services 170 including, for example, a social network 172, a mobile push notification service 174, a geo-location service 176, etc.

The failure recovery testing system 160 is configured to enable resiliency testing of the microservice-based application 140. The failure recovery testing system 160 is configured to process test scripts (referred to herein as "recipes") to stage various types of application-level failures in the microservice-based distributed application 140 by intercepting and manipulating network interactions between the microservices 141-146. In one embodiment, the failure recovery system 160 exposes an interface that enables a human operator to generate a test script (or reuse an existing test script) which specifies (i) a failure scenario (to be staged) in the distributed microservice-based application 140 and (ii) an asserted behavioral expectation of one or more of the constituent microservices 141-146 in response to the specified failure scenario (i.e., the assertions specify how various microservices should react during the specified failure scenario). The failure recovery testing system 160 translates the test script into fault injection rules, and utilizes the fault injection rules during failure recovery testing of the distributed microservice-based application 140 to execute fault injection operations on messages that are exchanged between microservices of the distributed microservice-based application 140. The execution of the fault injection operations on the messages serves to stage the failure scenario(s) as specified in the test script. In this regard, the failure recovery testing system 160 can recreate common application-level failure scenarios by intercepting and manipulating messages exchanged between the microservices 141-146 at the network layer.

During the failure recovery testing of the distributed microservice-based application 140, the failure recovery system 160 is configured to track and store event logs of the actual behavior of some or all of the microservices 141-146 in response to the staged application-level failure(s). The asserted behavioral expectation of the one or more constituent microservices (as specified in the test script) is compared to the actual observed behavior of the one or more constituent microservices in response to the execution of the fault injection operations.

In this regard, the failure recovery testing system 160 exposes an interface that enables a human operator to run assertions on, or otherwise perform statistical analyses on data associated with, the stored event logs (which event logs are indicative of the actual observed behavior of the one or more constituent microservices) to verify or otherwise validate if the actual behavior of the microservices conformed to the expected service behavior (as indicated by the asserted behavioral expectation(s) specified in the test script). In one embodiment of the invention (as described below with reference to FIG. 2), a plurality of network proxies are programmatically configured by the failure recovery testing system 160 to intercept, log, and manipulate messages that are exchanged between the constituent microservices of the application 140 during the resiliency test.

To remain highly available in the face of infrastructure outages in the cloud, microservice application designers typically incorporate several resiliency related design patterns for resilience including, for example timeouts, retries, circuit breakers, and bulkheads. In one embodiment of the invention, the failure recovery testing system 160 is configured to validate correct implementation of these design patterns in a given microservice-based application.

In particular, timeouts are used to ensure that an API call to a microservice completes in bounded time so as to maintain responsiveness and to release resources associated with the API call in a timely fashion. Moreover, bounded retries are used to handle transient failures in the system, by retrying the API calls with the expectation that the fault is temporary. The API calls are retried for a bounded number of times and are usually accompanied with an exponential backoff strategy to prevent overloading the target service.

Further, "circuit breakers" are used to prevent failures from cascading across the microservice chain. When repeated calls to a microservice fail, the circuit breaker transitions to open mode and the service returns a cached (or default) response to its upstream microservice. After a fixed time period, an attempt is made to re-establish connectivity with the failed downstream service. If successful, the circuit is closed again. The definition of success is implementation dependent. It can be based on different metrics such as response times within a threshold, number of errors in a time period, etc. Finally, "bulkheads" are typically used for fault isolation within a microservice. If a shared thread pool is used to make API calls to multiple microservices, thread pool resources can be quickly exhausted when one of the services degrades. Resource exhaustion renders the service incapable of processing new requests. The bulkhead pattern mitigates this issue by assigning an independent thread pool for each type of dependent microservice being called.

In one embodiment of the invention, the failure recovery testing system 160 comprises a software defined resiliency testing framework (similar to that of a software defined network (SDN)) which is implemented using software libraries. In this regard, the cloud computing platform 150 can implement a software development kit (SDK) which comprises a set of software development tools that enables a service provider of the cloud computing platform 150 to develop the failure recovery testing system 160 for resiliency testing of the distributed microservice-based application 140 hosted by the cloud computing platform 150. The SDK allows the failure recovery testing system 160 to be integrated into the framework of the application 140 without requiring modifications to the application-layer code.

In another embodiment of the invention, the failure recovery testing system 160 can be implemented as a web service that is provided by a third-party service provider. In such instance, the service provider of the cloud computing platform 150 can access the third-party web service to generate and submit test scripts (recipes), and the third-party web service can conduct a resiliency test on the distributed microservice-based application 140 based on the submitted test scripts. In this embodiment, since the business logic of the resiliency testing framework of the third party web service is independent of the application programming logic of the constituent microservices 141-146 of the application 140, and simply intercepts and manipulates messages that are exchanged between the microservices 141-146 over a network (network-based testing), there is no need to interface the business logic of the third party web service with the application logic of the microservices 141-146 to perform resiliency testing of the application 140. In this regard, a web service based resiliency testing framework can be utilized to test various different types of microservice-based applications from different service providers.

Figure 2:
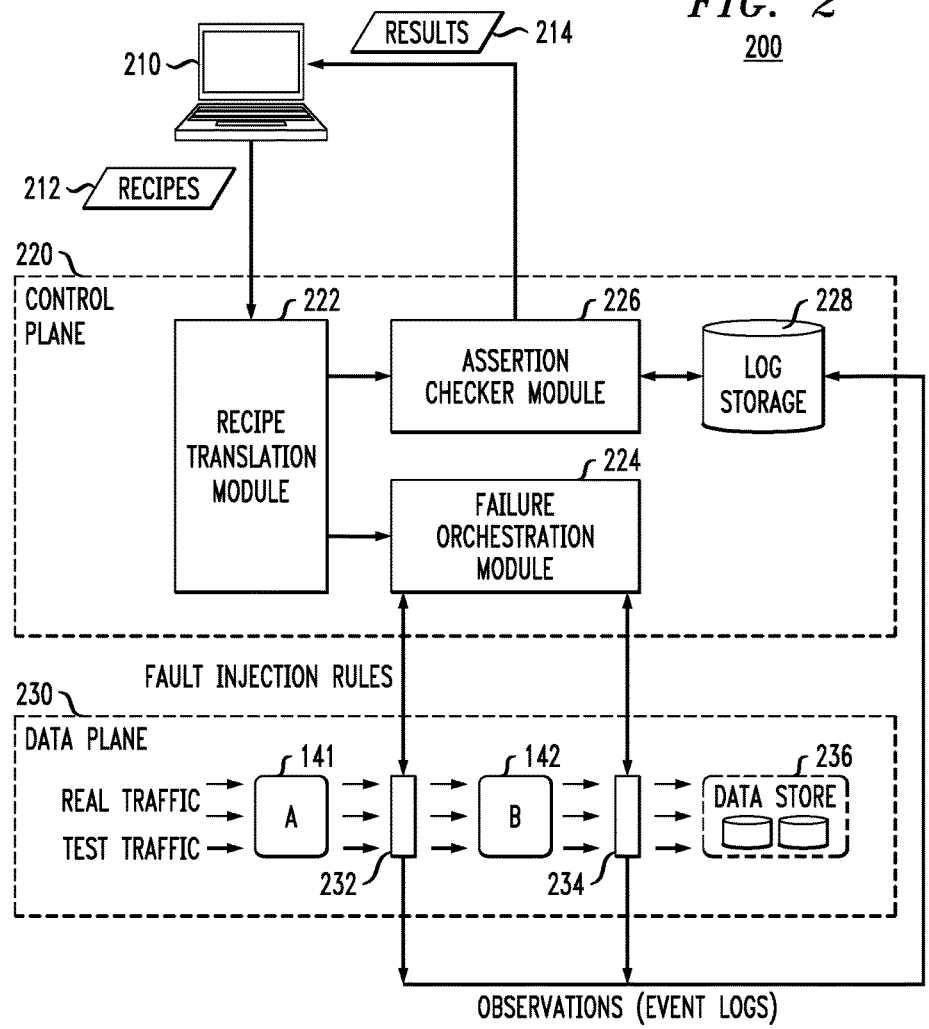
FIG. 2 illustrates a failure recovery testing system which can be implemented in a cloud computing system for resiliency testing of a microservice-based application, according to an embodiment of the invention.

FIG. 2 illustrates a failure recovery testing system 200 which can be implemented in a cloud computing system for resiliency testing of a microservice-based application, according to an embodiment of the invention. In particular, the failure recovery testing system 200 of FIG. 2 illustrates an example embodiment for integrating the failure recovery testing system 160 of FIG. 1 with the microservice-based application 140 of FIG. 1, wherein only two microservices 141 and 142 of the microservice-based application 140 are shown in FIG. 2 for ease of illustration and economy of description.

As shown in FIG. 2, the failure recovery testing system 200 comprises an operator control terminal 210, a control plane 220, and a data plane 230. The operator control terminal 210 allows a human operator to generate one or more recipes 212 which are input to the control plane 220 for staging failure scenarios, and to capture and review results 214 that are obtained from the staging of failure scenarios. The control plane 220 comprises a recipe translation module 222, a failure orchestration module 224, an assertion checker module 226, and a log data storage 228 (e.g., event log database). The data plane 230 comprises a plurality of network proxies 232 and 234 (alternatively referred to as agents) which are programmatically configured by the failure orchestration module 224 to intercept, log, and manipulate messages exchanged between the deployed services (e.g., services 141, 142, and 236) based on fault injection rules provided by the failure orchestration module 224. In the example embodiment of FIG. 2, the service 236 comprises a datastore service which, for example represents one or more of the database services 152 and 154 of the cloud computing platform 150 (as shown in FIG. 1) that are utilized by the microservice-based application 140.

With the failure recovery testing system 200 shown in FIG. 2, a human operator (e.g., software developer or a system tester) utilizes the operator control terminal 210 to generate or otherwise reuse existing test scripts (e.g., recipes 212). As noted above, a recipe comprises a test description (written in Python code, for example) which specifies one or more failure scenarios that are to be created/staged, as well as assertions of the expected behavior of one or more microservices in response to the staged failure scenario(s), wherein the assertions of the expected behavior are to be validated against actual observed behavior of the one or more microservices in response to the staged failure scenario(s) via operation of the assertion checker module 226.

Consider for example, a microservice-based application comprising two HTTP-based microservices, namely ServiceA, ServiceB, where ServiceA invokes web service endpoints exposed by ServiceB. An operator may want to test the resiliency of ServiceA against any degradation of ServiceB, with the expectation that ServiceA would retry failed API calls no more than 5 times (to avoid exacerbating the situation). With the failure recovery testing system 200 shown in FIG. 2, the operator can perform this resiliency test using the following example recipe to stage an overload (wherein the boiler plate code has been omitted for brevity):

Example 1: Overload Test

```
1 Overload(ServiceB)
2 HasBoundedRetries(ServiceA, ServiceB, 5)
```

In line 1, the failure recovery testing system 200 emulates the overloaded state of ServiceB, without actually impacting ServiceB. When test traffic is injected into the microservice-based application, ServiceA would experience delayed responses from ServiceB, or would receive an HTTP error code (e.g., error code 503 Service unavailable). The assertion specified in line 2 of the above example is indicative of the operator's expectation that when ServiceA encounters such behavior, it should restrict the number of retry attempts to 5 times.

Referring again to FIG. 2, the recipe translation module 222 of the control plane 220 is configured to receive a test script (recipe 212) from the operator control terminal 210 and translate a high-level failure scenario as specified in the recipe 212 into low-level fault injection rules and assertions using a logical application topology. The failure orchestration module 224 is configured to utilize the fault injection rules to execute fault injection operations on messages that are exchanged between the deployed services (e.g., between the first microservice 141 and the second microservice 142, and between the second microservice 142 and the backend datastore service 236) to thereby stage the specified failure scenario. In particular, the failure orchestration module 224 is configured to program the network proxies 232 and 234 in the physical deployment so that the network proxies 232 and 234 are configured to (i) identify messages that are associated with test traffic exchanged between the services (e.g., first microservice 141, second microservice 142, datastore service 236) and (ii) execute the fault injection operations on the identified messages to stage the specified failure scenario based on the fault injection rules. As shown in FIG. 2, the resiliency testing of a distributed microservice-based application can be executed concurrently with real-time operation of the distributed microservice application, wherein both real traffic and test traffic is injected into the application, but wherein the resiliency testing is applied by intercepting and manipulating only those messages associated with the injected test traffic.

The assertion checker module 226 is configured to compare the assertions of expected behaviors of one or more microservices (as specified in the recipe 212) with the actual observed behavior of the one or more microservices in response to the execution of the fault injection operations. In particular, while staging a failure scenario during a resiliency test of a distributed microservice-based application, the observed behavior of some or all of the constituent microservices of the distributed microservice-based application are persistently stored as event logs in the event log data storage 228 in the control plane 220. After failure scenario staging is complete, the assertion checker module 226 can be utilized to access and analyze the event logs (which are stored in log data storage 228 by the network proxies 232 and 234) to validate or otherwise verify the assertions of expected microservice behavior (as specified in the associated recipe 212) based on the actual observed microservice behavior information captured in the event logs. For example, assertions can be executed on the event logs to verify if a given service (e.g., Service A 141) implements a BoundedRetry pattern when calling another service (e.g., Service B 142). The reason this information is important is that unbounded retries to a service can aggravate an overload failure.

It is to be appreciated that with the resiliency testing system 200 of FIG. 2, a given recipe can be executed and verified in a matter of seconds, thereby providing a quick feedback to the tester. The low-latency feedback provided by the failure recovery testing system 200 enables the operator to create correlated failure scenarios by conditionally chaining different types of failures and assertion checks. Examples of expressing and testing common failure scenarios using generic recipes will be described in further detail below.

The network proxies 232 and 234 of the data plane 230 comprise application and runtime agnostic network service proxies. The microservices 141 and 142 are configured to communicate with other services via the network proxies 232 and 234. In one embodiment of the invention, as shown in FIG. 2, each microservice 141 and 142 utilizes an associated network proxy 232 and 234 to communicate with other services that are implemented or otherwise utilized by the microservice-based application. In another embodiment, the data plane 230 may include only one network proxy through which all constituent microservices of a given application communicate with each other. In addition to proxying the API calls, the network proxies 232 and 234 manipulate the arguments and return values, thus acting as fault injectors. In one embodiment of the invention, the data plane 230 supports primitive fault injection operations such as Drop, Delay, and Modify, as shown in the following Table:

TABLE 1

| Interface | Parameters | Description |
|---|---|---|
| Drop | P, Src, Dst, Error | Drop messages from Src to Dst, where messages match pattern P, Return an application-level Error code to Src |
| Delay | P, Src, Dst, Interval | Delay forwarding of messages from Src to Dst, that match pattern P, by specified Interval |
| Modify | P, Src, Dst, ReplaceBytes | Rewrite messages from Src to Dst, that match pattern P and replace matched bytes with ReplaceBytes |

In particular, TABLE 1 illustrates an exemplary interface exposed by the data plane network proxies 232 and 234 to the control plane 220. Messages refers to the application layer payload (Layer 7), without TCP/IP headers. The primitive fault injection operations include, but are not limited to: (i) a first fault injection operation (Drop) that causes a message from a source microservice (Src) to a destination microservice (Dst) to be dropped, and an application-level error code (Error) to be returned to the source microservice; (ii) a second fault injection operation (Delay) that causes a message to be forwarded from a source microservice (Src) to a destination microservice (Dst) with a specified delay time (Interval); and (iii) a third fault injection operation (Modify) that causes a message from a source microservice (Src) to a destination microservice (Dst) to be rewritten with specified replace bytes (ReplaceBytes).

Using these primitive fault injection operations, it is possible to construct complex failure scenarios that emulate real world outages. In this regard, similar to SDN switches, the network proxies 232 and 234 expose a small set of well-defined interfaces to the control plane 220. The control plane 220 configures the network proxies 232 and 234 by using fault injection rules that instruct the network proxies 232 and 234 to inspect the test traffic messages and perform fault injection actions if a message matches given criteria. Since the network proxies 232 and 234 are agnostic to the microservice-based application, a protocol is implemented to identify/delineate message boundaries. In one embodiment of the invention, we leverage the fact that due to the diversity of runtimes, microservices communicate using a common application layer protocol (e.g., HTTP) which can be easily decoded by the network proxies 232 and 234. The semantics of the fault injection primitives (e.g., Drop, Delay, and Modify) also depends on the application protocol being used. For example, with HTTP, the Drop primitive would return HTTP error codes such as 404 Resource not found or 503 Service unavailable. Custom protocols can be supported, given that the implementation is augmented accordingly.

Furthermore, the failure recovery testing system 200 implements a methodology for injecting faults on specific request flows. To assist with monitoring and troubleshooting, a common practice in microservice-based applications is to generate a globally unique request ID per user request and propagate the ID to downstream services. The request ID is embedded in the application protocol headers (e.g., HTTP headers) and logged by each microservice. The flow of a user's request across different microservices can be traced using the unique request ID. In this regard, in one embodiment of the invention, the network proxies 232 and 234 can be programmed to limit fault injection of message and logging of event to specific request flows by filtering the messages using request IDs, or other tagging schemes in which tags are used to indicate which message are associated with specific test traffic streams.

In addition, the failure recovery testing system 200 implements a methodology for logging observations during a test. In particular, in one embodiment of the invention, during a test, the network proxies 232 and 234 log the API calls made by the microservices and report them to the control plane 220 (e.g., store the event logs in the log data storage 228). Each network proxy 232 and 234 records certain information about an API call such as: (i) message timestamp and request ID; (ii) parts of the message (e.g., request URI, response status for HTTP); and (iii) fault actions applied to the message, if any. This information is persistently stored as event logs in the log data storage 228, wherein such information can be accessed and analyzed by the control plane 220 (e.g., the assertion checker module 226) to check/verify/validate the assertions of expected microservice behavior as specified in the given recipe 212.

Further details of the functionality of the control plane 220 according to embodiments of the invention, will now be discussed. In the control plane 220, the recipe translation module 222 exposes an interface to the operator, which enables the operator to compose different high-level failure scenarios and assertions from pre-existing recipes or directly from a set of low-level primitives for fault injection (e.g., primitives shown in TABLE 1) and assertions (e.g., assertions as depicted in TABLE 2 of FIG. 4). The operator will also provide a logical application graph, wherein the logical application graph comprises a directed graph which describes caller/callee relationships between different microservices of the given microservice-based application. The recipe translation module 222 is configured to translate the recipe 212 into a set of fault injection rules to be executed on the application's logical topology (i.e., a dependency graph between various microservices). By way of example, in the recipe example, Overload Test, as discussed above, the Overload would be internally decomposed into Drop and Delay actions, which are parameterized and then passed to the failure orchestration module 224.

The low-level fault injection actions and assertions generated by the recipe translation module 222 pertain to the logical application graph of the given microservice-based application. The failure orchestration module 224 is configured to coordinate amongst the various network proxies 232 and 234 that are deployed alongside the microservice instances 141 and 142 in the physical deployment. For example, in one embodiment of the invention, the failure orchestration module 224 is configured to communicate the fault injection actions to the appropriate data plane network proxies 232 and 234 through an out of band control channel.

Figure 3:
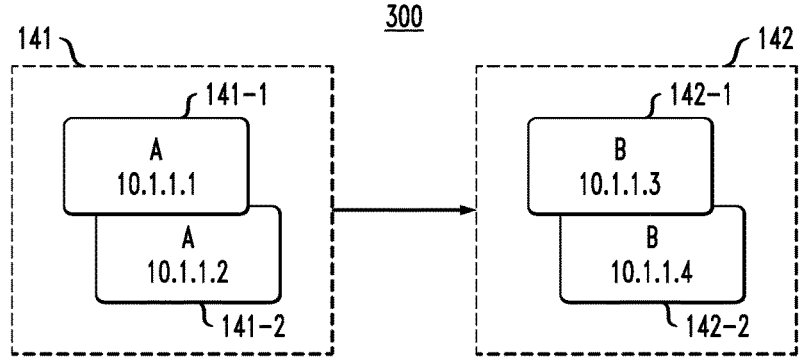
FIG. 3 illustrates a method for applying fault injection rules between pairs of microservices having multiple runtime instances, according to an embodiment of the invention.

FIG. 3 illustrates a method for applying fault injection rules between pairs of microservices having multiple runtime instances, according to an embodiment of the invention. In particular, in the example physical deployment 300 shown in FIG. 3, the microservice 141 (ServiceA) is shown as having two instances 141-1 and 141-2, and the microservice 142 (ServiceB) is shown as having two instances 142-1 and 142-2. When applying the fault injection rules, the failure orchestration module 224 communicates the fault injection actions between every pair of microservices ServiceA and ServiceB, by configuring the network proxies located at 10.1.1.1 and 10.1.1.2.

The failure orchestration module 224 passes the translated assertion checks (received from the recipe translation module 222) on to the assertion checker module 226. The assertion checker module 226 is configured to validate the assertions specified in a given recipe 212. In particular, in one embodiment of the invention, the assertion checker module 226 validates the assertions of expected service behavior as specified in a given recipe 212 by querying the centralized event log data storage 228 to access the event log information collected and persistently stored in the event log data storage 228 by the network proxies 232 and 234, and perform a variety of processing steps on the accessed event log information. To assist the operator in querying the event logs stored in the event log data storage 228, the control plane 220 of the failure recovery testing system 200 provides various abstractions for fetching and analyzing the data.

For example, FIG. 4 illustrates an interface that is exposed by the assertion checker module 226, according to an embodiment of the invention. As shown in FIG. 4, the interface comprises queries 400, base assertions 402, and pattern checks 404. The queries 400 include GetRequests and GetReplies which are configured to return a filtered list of observations from the network proxies 232 and 234, sorted by time, wherein a filtered list of observations is referred to herein as RList. Other queries 400 (e.g., NumRequests and ReplyLatency) and base assertions 402 operate on RList to compute basic statistics on the requests (or replies), such as number of requests in a time period, rate of requests, absence of requests in a time period, etc. The pattern checks 404 comprises various checks that can be utilized to validate the presence of the resiliency related design patterns including, for example timeouts, retries, circuit breakers, and bulkheads, as discussed above.

The base assertions 402 comprise several important features. First, the base assertions allow service behavior to be combined with the test system's fault injection during analysis (e.g., by using a withRule parameter). For example, consider the previous example recipe with ServiceA and ServiceB and the emulation of an Overload of ServiceB. In this example, a ReplyLatency (RList, withRule=True) query calculates delayed reply timings from ServiceB, as ServiceA would have observed them. This allows the construction of accurate preconditions when validating the behavior of ServiceA. On the other hand, if the operator is also interested in the actual behavior of ServiceB (e.g., during multiple injected faults), specifying withRule=False will return such observations.

Furthermore, the base assertions can be chained using a special Combine operator to evaluate a sequence of operations. Consider the following example:

Combine(RList, (CheckStatus,404,5,True), (NoRequests, '1min'))

This assertion can validate the initial behavior of a circuit breaker design pattern, wherein upon seeing 5 API call failures, backoff for a minute, before issuing more API calls to the same microservice. The Combine operator automatically "discards" requests that have triggered the first assertion before passing RList to the second assertion.

With regard to chained failure, the operator can take advantage of a given programming language (e.g., Python) to construct complex test scenarios by interacting with the control plane 220. For example, consider the previous example, which could be expanded into a multi-step test as follows:

```
1 Overload(ServiceB)
2 if not HasBoundedRetries(ServiceA, ServiceB, 5):
3     raise 'No bounded retries'
4 else:
5     Crash(ServiceB)
6 HasCircuitBreaker(ServiceA, ServiceB, ...)
```

The first line introduces an Overload failure. If a bounded retry pattern is implemented at ServiceA, the operator can proceed to emulate a different type of failure to determine if ServiceA has a circuit breaker.

For illustrative purposes, we present a few examples of service failures that can be built on top of the Drop, Delay, and Modify primitives as shown in TABLE 1 above. For instance, consider a disconnect primitive, which returns a HTTP error code when ServiceA sends a request to ServiceB:

```
1 def Disconnect(ServiceA, ServiceB):
2     Drop(ServiceA, ServiceB, on='request',
          prob=1, ret=404, idpattern='test-*')
```

Internally, this instructs the network proxy 232 of ServiceA to drop all (probability=1) test requests (based on idpattern) and return a NotFound error code (404). A network partition is implemented using a series of Disconnect operations along the cut of an application graph (not shown for brevity).

By way of further example, a Crash failure of a service can be created by dropping the request from all dependent services to the service in question (for brevity, we assume existence of functions such as dependents and services that return dependents of a service and the list of all services, respectively) as follow:

```
1 def Crash(ServiceA):
2     for s in dependents(ServiceA):
3         Drop(ServiceA, s, on='request', prob=1, ret=None)
```

Moreover, transient crashes can be simulated by reducing the drop probability. An overload of a service can be simulated using a simple Delay, however it must be applied to all dependents of a particular service, as follows:

```
1 def Overload(ServiceA):
2     for s in dependents(ServiceA):
3         Drop(ServiceA, s, on='request', prob=.25, ret=None
             ↪ )
4         Delay(s, ServiceA, on='request', prob=.75, delay='
             ↪ 100ms')
```

In this example, the failure orchestration module 224 would delay requests between ServiceA and its neighboring services.

Next, we show the applicability of an embodiment of a failure recovery testing system according to the invention for staging real world outages by modeling a subset of real world outages that have actually occurred in the past. Note, that even with careful study of the post-mortem reports, we cannot know the precise deployment scenario of each application, but proof-of-concept test remains the same. Where applicable, the assertions that could have caught the unexpected behavior are described.

Cascading Failures Caused by Middleware

In October 2013, Stackdriver experienced an outage when its Cassandra cluster crashed. Data published by various services into a message bus was being forwarded to the Cassandra cluster. When the cluster failed, the failure percolated to the message bus, filling the queues and blocking the publishers. Eventually the entire application failed. An example recipe to stage this failure scenario is as follows:

```
1 Crash('cassandra')
2 for s in dependents('messagebus'):
3     if not HasTimeouts(s, '1s')
4     and not HasCircuitBreaker(s, 'messagebus', ...)):
5         raise 'Will block on message bus'
```

Data Store Overload

In July 2014, BBC Online experienced a very long outage of several of its popular online services including the BBC iPlayer. When the database backend was overloaded, it had started to throttle requests from various services. Services that had not cached the database responses locally began timing out and eventually failed completely. An example recipe to stage this failure scenario is as follows:

```
1 Overload('database')
2 for s in dependents('database'):
3     if not HasCircuitBreaker(s, 'database', ...)
4         raise 'Will overload database'
```

A very similar overload scenario had caused a Joyent outage in July 2015, where an overloaded PostgreSQL database was the cause for multiple delayed and canceled requests. We note that the same failure specification can be reused for different applications by simply changing the application graph. In both cases, it was verified that that the service accessing the database had implemented circuit breakers.

Figure 5:
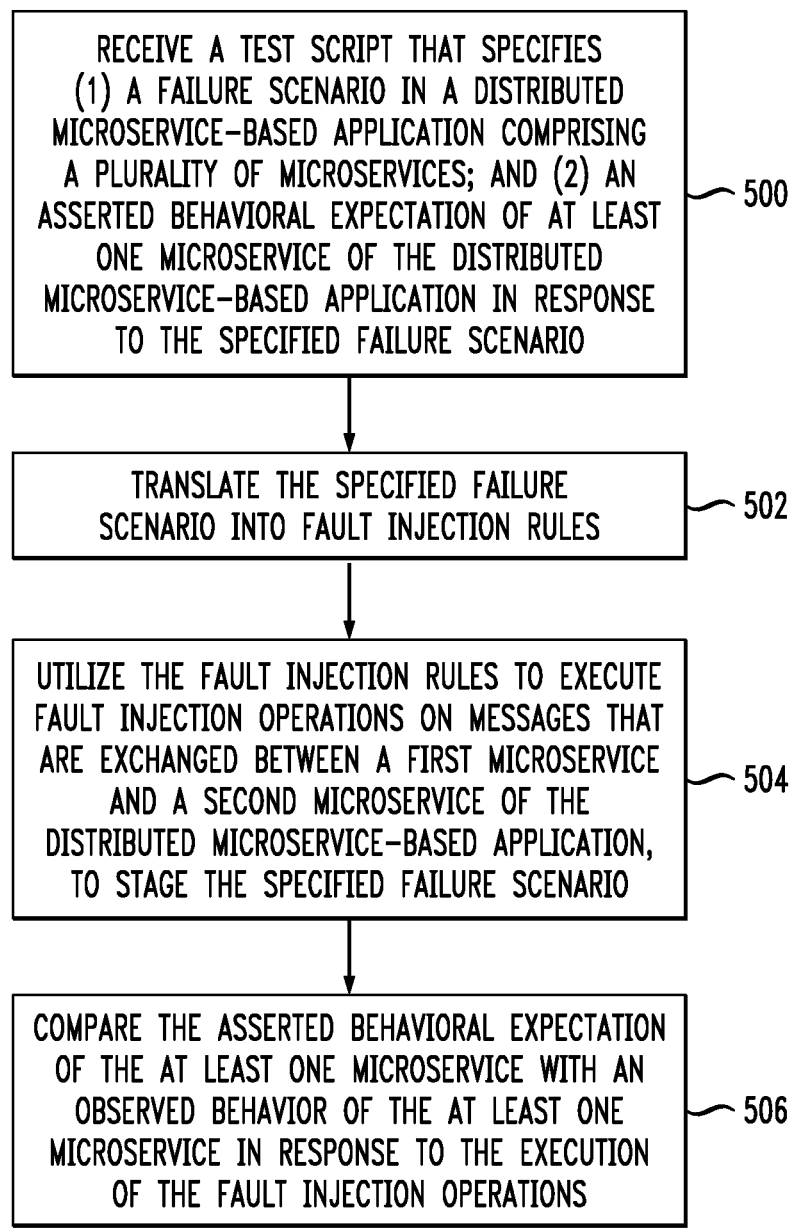
FIG. 5 is a flow diagram of a method for failure recovery testing of a microservice-based application, according to an embodiment of the invention.

FIG. 5 is a flow diagram of a method for failure recovery testing of a microservice-based application, according to an embodiment of the invention. For purposes of illustration, the method of FIG. 5 will be discussed in the context of the system of FIG. 2, wherein FIG. 5 can be considered a mode of operation of the control plane 220 shown in FIG. 2. Referring to FIG. 5, an initial step comprises the control plane 220 receiving a test script that specifies (i) a failure scenario in a distributed microservice-based application comprising a plurality of microservices; and (ii) an asserted behavioral expectation of at least one microservice of the distributed microservice-based application in response to the specified failure scenario (block 500). As discussed above, in one embodiment, a test script (e.g., recipe 212) can be generated by a human operator using the control terminal 210. The control plane 220 exposes an interface which enables the operation to compose different high-level failure scenarios and assertions from per-existing recipes or directly from low-level primitives for fault injection (e.g., primitives as shown in TABLE 1).

When the test script is received by the control plane 220, the control plane proceeds to translate the specified failure scenario into fault injection rules (block 502). In one embodiment of the invention, this translation process is performed by the recipe translation module 222 shown in FIG. 2. As discussed above, the recipe translation module 222 translates the received recipe into a set of fault injection rules to be executed on the logical topology of the distributed microservice-based application, wherein the logical topology is defined as a dependency graph between the constituent microservices of the distributed microservice-based application.

Next, the control plane 220 utilizes the fault injection rules to execute fault injection operations on messages that are exchanged between at least a first microservice and a second microservice of the distributed microservice-based application, wherein execution of the fault injection operations on these message result in staging of the specified failure scenario during the failure recovery testing of the distributed microservice-based application (block 504). As discussed above with reference to TABLE 1, the fault injection operations include, but are not limited to, (i) a first fault injection operation (Drop) that causes a message from a source microservice to a destination microservice to be dropped, and an application-level error code to be returned to the source microservice; (ii) a second fault injection operation (Delay) that causes a message to be forwarded from a source microservice to a destination microservice with a specified delay time; and (iii) a third fault injection operation (Modify) that causes a message from a source microservice to a destination microservice to be rewritten with specified replace bytes.

In one embodiment of the invention, execution of the fault injection rules is performed by the failure orchestration module 224 of the control plane 220. For example, as discussed above, the failure orchestration module 224 configures one or more network proxies to (i) identify messages that are associated with test traffic exchanged between the first microservice and the second microservice, and to (ii) execute the fault injection operations on the identified messages to stage the specified failure scenario. The one or more network proxies comprise runtime agnostic network proxies that coordinate communication of messages between the microservices. The messages that are associated with the test traffic comprise messages that are tagged with an identifier which indicates that the tagged messages are associated with the test traffic.

Referring again to FIG. 5, a next step in the exemplary test protocol implemented by the control plane 220 comprises comparing the asserted behavioral expectation of the at least one microservice with an observed behavior of the at least one microservice in response to the execution of the fault injection operations (block 506). In one embodiment of the invention, this comparison is performed by the assertion checker module 226 of the control plane 220, as shown in FIG. 2. In one embodiment, when a failure is staged by applying the fault injection rules to messages that are exchanged between the first and second microservices, the comparison (block 506) can be performed between the asserted behavioral expectation and the observed behavior of a third microservice (or other microservices) based on the staged failure scenario between the first and second microservices. In another embodiment, when a failure is staged by applying the fault injection rules to messages that are exchanged between the first and second microservices, the comparison (block 506) can be performed between the asserted behavioral expectation and the observed behavior of the first microservice and/or the second microservice based on the staged failure scenario between the first and second microservices.

In one embodiment of the invention, the process (block 506) of comparing the asserted behavioral expectation of the at least one microservice with an observed behavior of the at least one microservice in response to the execution of the fault injection operations comprises persistently storing data associated with the observed behavior of the at least one microservice in an event log database (e.g., log data storage 228, FIG. 2), and analyzing the stored data associated with observed behavior to verify whether the observed behavior of the at least one microservice conforms to the asserted behavioral expectation of the at least one microservice. As noted above, FIG. 4 depicts an exemplary interface that can be implemented to fetch and analyze observed behavioral data that is persistently stored in event logs (in the log data storage 228) to validate assertions provided in a given recipe.

To determine the efficacy of a failure recovery testing system according to an embodiment of the invention, we implemented a failure recovery testing system based on the following framework, and tested the framework using existing real-world microservice-based applications with no source code modifications. For example, in the example implementation, the recipe translation module 222, the failure orchestration module 224, and the assertion checker module 226 were implemented as reusable Python libraries. The recipes were written as Python programs that leveraged the Python libraries. A standard logging pipeline, such as logstash, was implemented to collect logs from the service proxies and store them in Elasticsearch (which is a search server that provides a distributed, multitenant-capable full-text search engine with an HTTP web interface and schema-free JSON documents). The GetRequests and GetReplies of the assertion checker module 226 were queries to Elasticsearch to obtain records required for the assertions of a given recipe. Further computations on the log records were specific to each assertion. Our implementation did not address the task of injecting test load into the application. We assume that the developer is aware of specific types of user requests that would traverse the microservices that the developer is trying to test or use one of many injection tools to easily inject arbitrary load into the system.

A data plane agent (e.g., network proxies 232 and 234, FIG. 2) was implemented using a service proxy. A service proxy acts as a Layer-7 router, handling outbound calls from a microservice. This is well suited to implement a data plane agent for a failure recovery testing system according to an embodiment of the invention as the service proxy already has natural access to the messages passing through the system. There are several ways of implementing the service proxy capabilities. A first approach is referred to as a sidecar approach, which is used by various service providers. In this model, the service proxy runs as a standalone process in a same Docker container or VM (virtual machine) as the microservice. Communication between the microservice and the service proxy occurs over a loopback network interface. A second approach, which is implemented by other service providers, is to provide language specific libraries. In either case, the service proxy remains immune to the evolution of the application logic. The sidecar proxy approach is a preferred implementation as we believe it to be the most runtime agnostic approach. However, for library-based service proxy architectures, writing a client-side library which implements the fault injection rules provided by the failure orchestrator and which configures an API is a straightforward task.

A data plane agent (written in, e.g., Go) is configurable via REST API by the control plane and can be executed alongside unmodified microservices that use the external service proxy model. In this model, microservices specify their external dependencies to the service proxy in the form of a configuration file containing a list of mappings in the form of:

localhost: <port>-<remoteservice>[:<remoteport>].

Such mappings can be static, or utilize a service registry for dynamic binding.

Through testing, we found that a failure recovery testing system based on the framework discussed above, is effective in testing existing real-world applications with no source code modifications, and is capable of triggering and uncovering previously unknown bugs. In particular, we used the failure recovery testing system to test a proprietary application developed at IBM and deployed in the IBM container cloud. At high level, the application is responsible for searching and analyzing content based on user's criteria. The application consists of a web user interface and three backed services that the UI depends on. The developers of the application utilized the framework to write several tests and execute them in a dedicated environment. The results of these tests demonstrated that: (i) a failure recovery testing system based on a framework as discussed above can be readily used by enterprise developers; (ii) mistakes in the application's logic can be discovered prior to running tests by virtue of writing a failure scenario; and that (iii) running the various tests resulted in the triggering and discovery of unknown bugs.

While various schemes that have been proposed or implemented for testing and validating the robustness of a distributed system using both software and hardware fault injection techniques, these techniques differ from the embodiments of the failure recovery testing frameworks discussed herein according the invention. Indeed, the example embodiments of failure recovery testing frameworks as discussed herein differ from all other proposed resiliency testing systems in that such failure recovery testing frameworks are runtime agnostic and can be readily used for testing polyglot microservice deployments, and are resistant to code churn, and do not require knowledge about the internals of individual microservices nor modifications to the microservice source code. The failure recovery testing frameworks as discussed herein according to embodiments of the invention can be readily implemented for staging failures in microservice-based applications and comparing observed versus expected behaviors of the constituent microservice in response to the staged failures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

These concepts are illustrated with reference to FIG. 6, which shows a computing node 10 comprising a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 6:
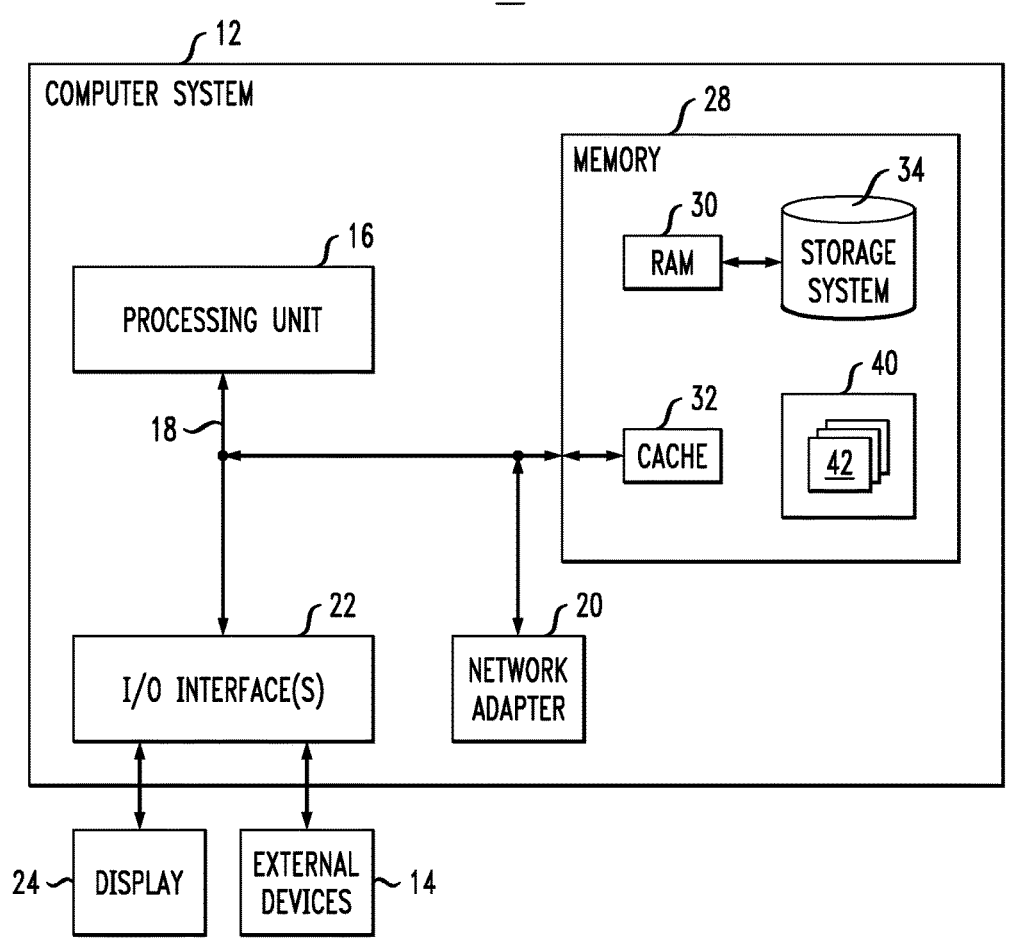
FIG. 6 illustrates a computer system that may be used to implement one or more components/steps of systems/methods for failure recovery testing of a microservice-based application, according to an embodiment of the invention.

In FIG. 6, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 typically includes a variety of computer system readable media. Such media may be any available media that is accessible by computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/nonvolatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As depicted and described herein, memory 28 may include at least one program product having a set (e.g., at least one) of program modules that are configured to carry out the functions of embodiments of the invention.

The program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

It is to be understood that embodiments of the invention can be implemented as a cloud service on one or more cloud computing platforms, while in other embodiments of the invention, implementation of the systems and methods recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
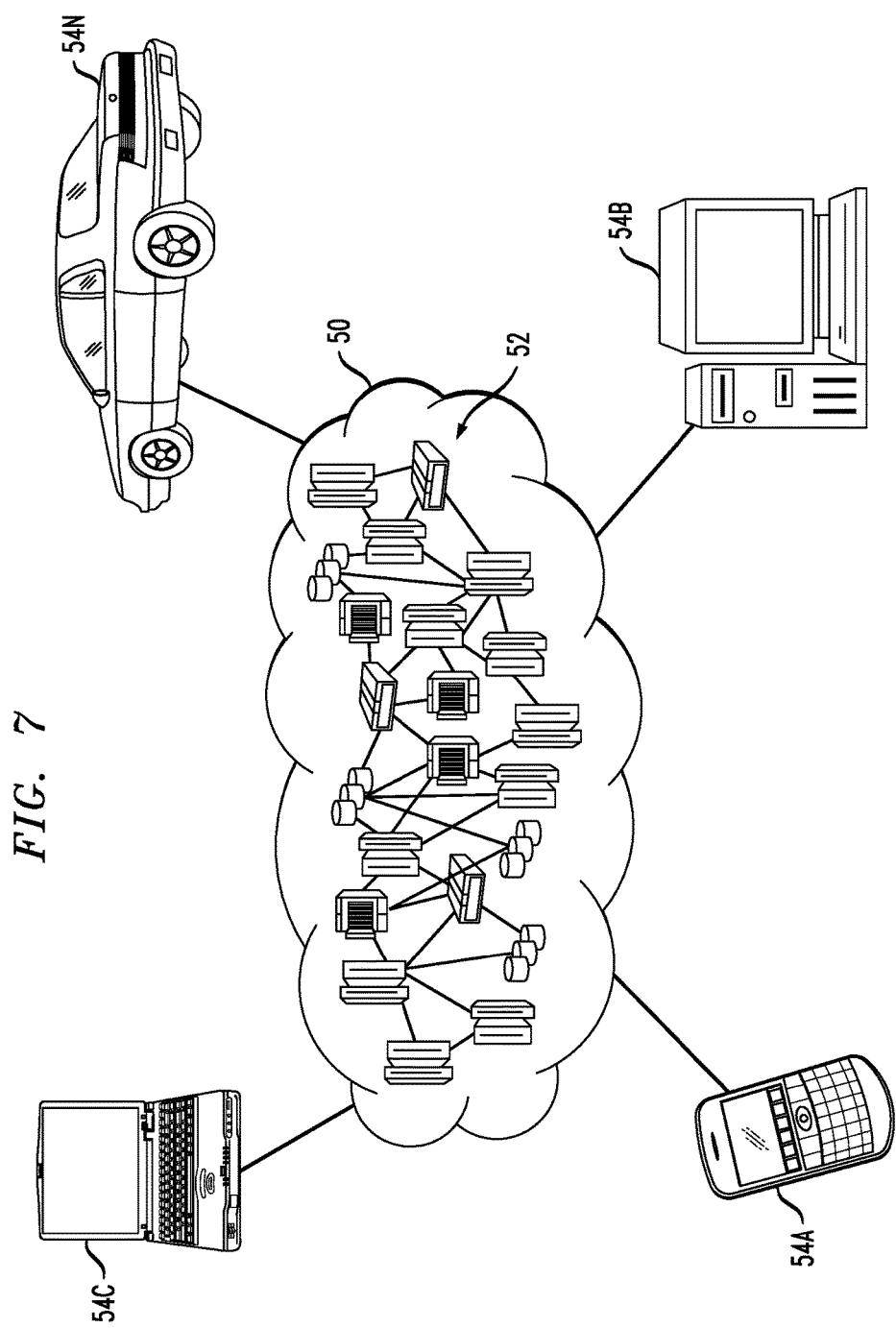
FIG. 7 depicts a cloud computing environment according to an embodiment of the invention.

Referring now to FIG. 7, an illustrative cloud computing environment 50 is depicted. As shown, cloud computing environment 50 comprises one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 52 and cloud computing environment 50 can communicate with any type of computerized device over any type of network and/or network addressable connection (e.g., using a web browser).

Figure 8:
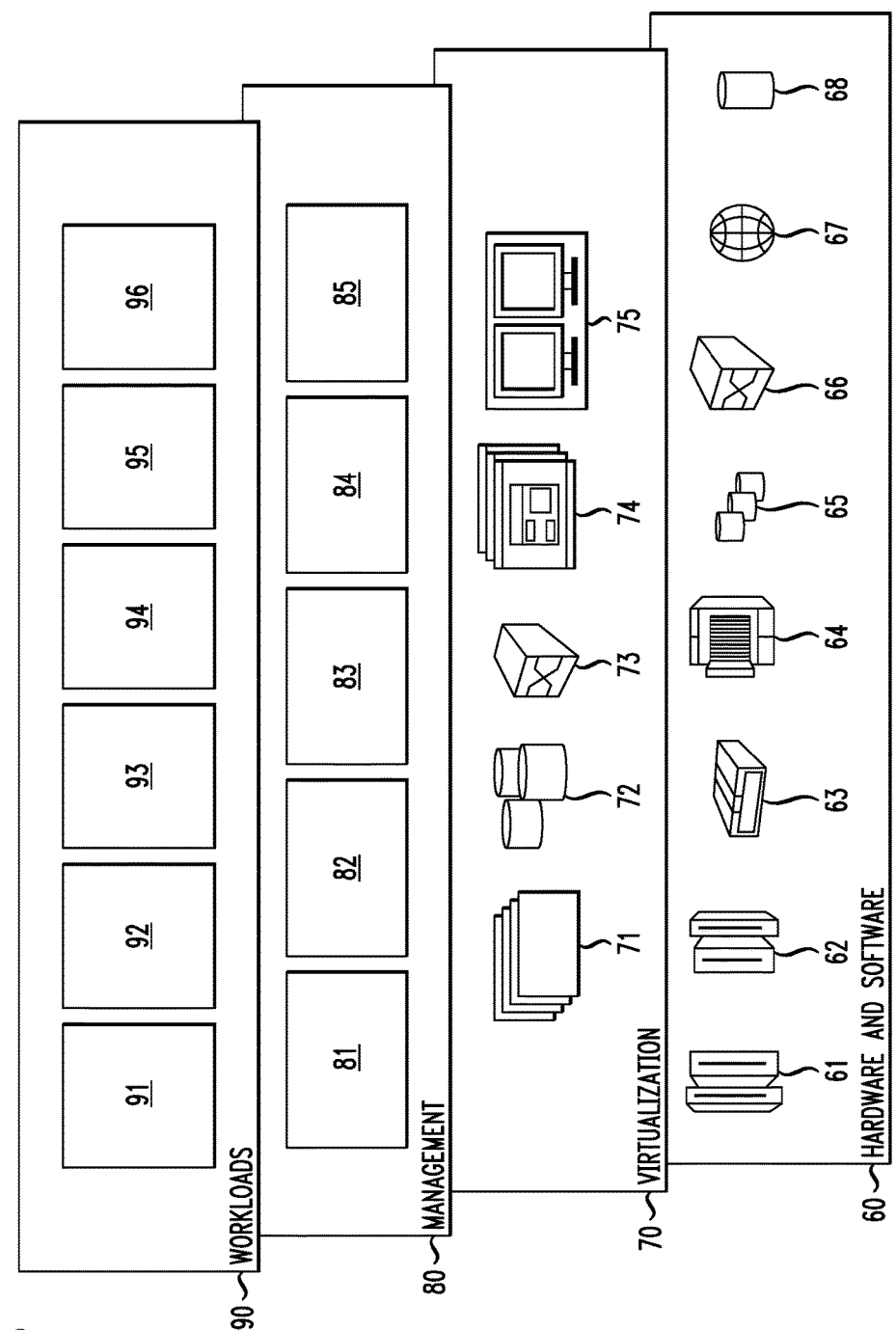
FIG. 8 depicts abstraction model layers of a cloud computing environment according to an embodiment of the invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide functions as described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. In addition, in one embodiment, the management layer 80 implements the failure recovery testing functionality as discussed above with reference to the systems and methods of FIGS. 1, 2, 3, 4 and 5, for example.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and other typical workloads 96 such as mobile desktop or other workload functions as discussed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain embodiments of the embodiments, the practical application or technical improvement over technologies found in the marketplace, or to enable others of ordinary skill in the art to understand the embodiments disclosed herein.

What is claimed is:

1. A method, comprising:
    receiving a test script that specifies (i) a failure scenario in a distributed microservice-based application comprising a plurality of microservices; and (ii) an asserted behavioral expectation of at least one microservice of the distributed microservice-based application in response to the specified failure scenario;
    translating the specified failure scenario into fault injection rules; and
    performing failure recovery testing during a run-time operation of the distributed microservice-based application by a process comprising:
        utilizing the fault, injection rules to execute fault injection operations on messages that are exchanged at a network layer between at least a first microservice and a second microservice of the distributed microservice-based application during the run-time operation of the distributed microservice-based application, by intercepting and manipulating messages that are exchanged at the network layer between the at least first and second microservices to stage the specified failure scenario during the run time operation of the distributed microservice-based application; and
        comparing the asserted behavioral expectation of the at least one microservice with an observed behavior of the at least one microservice in response to the execution of the fault injection operations.

2. The method of claim 1, wherein utilizing the fault injection rules to execute fault injection operations on messages that are exchanged at the network layer comprises:
    configuring a network proxy to identify messages that are associated with test traffic exchanged between the first microservice and the second microservice; and
    configuring the network proxy to execute the fault injection operations on the identified messages to stage the specified failure scenario;
    wherein the network proxy comprises a runtime agnostic network proxy that coordinates communication of messages between the first and second microservices.

3. The method of claim 2, wherein the messages that are associated with the test traffic comprise messages that are tagged with an identifier which indicates that the tagged messages are associated with the test traffic.

4. The method of claim 1, wherein the fault injection operations comprise at least one of: (i) a first fault injection operation that causes a message from a source microservice to a destination microservice to be dropped, and an application-level error code to be returned to the source microservice; (ii) a second fault injection operation that causes a message to be forwarded from a source microservice to a destination microservice with a specified delay time; and (iii) a third fault injection operation that causes a message from a source microservice to a destination microservice to be rewritten with specified replace bytes.

5. The method of claim 1, wherein comparing the asserted behavioral expectation of the at least one microservice with an observed behavior of the at least one microservice in response to the execution of the fault injection actions comprises comparing the asserted behavioral expectation of a third microservice with an observed behavior of the third microservice in response to the execution of the fault injection actions on the messages that are exchanged between the first and second microservices of the distributed microservice-based application.

6. The method of claim 1, wherein comparing the asserted behavioral expectation of the at least one microservice with an observed behavior of the at least one microservice in response to the execution of the fault injection operations, comprises:
    persistently storing data associated with the observed behavior of the at least one microservice in an event log database; and
    analyzing the stored data associated with observed behavior to verify whether the observed behavior of the at least one microservice conforms to the asserted behavioral expectation of the at least one microservice.

7. The method of claim 1, wherein the test script is reusable for failure recovery testing of different distributed microservice-based applications.

8. An article of manufacture comprising a computer readable storage medium having program instructions embodied therewith, wherein the program instructions are executable by a computer to cause the computer to perform a method comprising:
receiving a test script that specifies (i) a failure scenario in a distributed microservice-based application comprising a plurality of microservices; and (ii) an asserted behavioral expectation of at least one microservice of the distributed microservice-based application in response to the specified failure scenario;
translating the specified failure scenario into fault injection rules; and
performing failure recovery testing during a run-time operation of the distributed microservice-based application by a process comprising:
utilizing the fault injection rules to execute fault injection operations on messages that are exchanged, at a network layer between at least a first microservice and a second microservice of the distributed microservice-based application during the run-time operation of the distributed microservice-based application, by intercepting and manipulating messages that are exchanged at the network layer between the at least first and second microservices to stage the specified failure scenario during the run time operation of the distributed microservice-based application; and
comparing the asserted behavioral expectation of the at least one microservice with an observed behavior of the at least one microservice in response to the execution of the fault injection operations.

9. The article of manufacture of claim 8, wherein the program instructions for utilizing the fault injection rules to execute fault injection operations on messages that are exchanged at the network layer comprise program instructions for:
configuring a network proxy to identify messages that are associated with test traffic exchanged between the first microservice and the second microservice; and
configuring the network proxy to execute the fault injection operations on the identified messages to stage the specified failure scenario;
wherein the network proxy comprises a runtime agnostic network proxy that coordinates communication of messages between the first and second microservices.

10. The article of manufacture of claim 9, wherein the messages that are associated with the test traffic comprise messages that are tagged with an identifier which indicates that the tagged messages are associated with the test traffic.

11. The article of manufacture of claim 8, wherein the fault injection operations comprise at least one of: (i) a first fault injection operation that causes a message from a source microservice to a destination microservice to be dropped, and an application-level error code to be returned to the source microservice; (ii) a second fault injection operation that causes a message to be forwarded from a source microservice to a destination microservice with a specified delay time; and (iii) a third fault injection operation that causes a message from a source microservice to a destination microservice to be rewritten with specified replace bytes.

12. The article of manufacture of claim 8, wherein the program instructions for comparing the asserted behavioral expectation of the at least one microservice with an observed behavior of the at least one microservice in response to the execution of the fault injection actions comprise program instructions for comparing the asserted behavioral expectation of a third microservice with an observed behavior of the third microservice in response to the execution of the fault injection actions on the messages that are exchanged between the first and second microservices of the distributed microservice-based application.

13. The article of manufacture of claim 8, wherein the program instructions for comparing the asserted behavioral expectation of the at least one microservice with an observed, behavior of the at least one microservice in response to the execution of the fault injection operations, comprise program instructions for:
persistently storing data associated with the observed behavior of the at least one microservice in an event log database; and
analyzing the stored data associated with observed behavior to verify whether the observed behavior of the at least one microservice conforms to the asserted behavioral expectation of the at least one microservice.

14. The article of manufacture of claim 8, wherein the test script is reusable for failure recovery testing of different distributed microservice-based applications.

15. A system, comprising:
a computing node comprising:
system memory to store program instructions; and
at least one processor configured to execute the program instructions to implement a control plane that is configured for resiliency testing of distributed-microservices applications, wherein the control plane comprises:
a translation module configured to receive a test script that specifies (i) a failure scenario in a distributed microservice-based application comprising a plurality of microservices; and (ii) an asserted behavioral expectation of at least one microservice of the distributed microservice-based application in response to the specified failure scenario, and translate the specified failure scenario into fault injection rules;
a failure orchestration module configured to utilize the fault injection rules to execute fault injection operations on messages that are exchanged at a network layer between at least a first microservice and a second microservice of the distributed microservice-based application during a run-time operation of the distributed microservice-based application, by configuring a network proxy to intercept and manipulate messages that are exchanged at the network layer between the at least first and second microservices to stage the specified failure scenario during the run-time operation of the distributed microservice-based application; and
an assertion checker module configured to compare the asserted behavioral expectation of the at least one microservice with an observed behavior of the at least one microservice in response to the execution of the fault injection operations.

16. The system of claim 15, wherein the failure orchestration module is configured to:
configure the network proxy to identify messages that are associated with test, traffic exchanged between the first microservice and the second microservice; and
configure the network, proxy to execute the fault injection operations on the identified messages to stage the specified failure scenario;

wherein the network proxy comprises a runtime agnostic network proxy that coordinates communication of messages between the first and second microservices.

17. The system of claim 15, wherein the fault injection operations comprise at least one of: (i) a first fault injection operation that causes a message from a source microservice to a destination microservice to be dropped, and an application-level error code to be returned to the source microservice; (ii) a second fault injection operation that causes a message to be forwarded from a source microservice to a destination microservice with a specified delay time; and (iii) a third fault injection operation that causes a message from a source microservice to a destination microservice to be rewritten with specified replace bytes.

18. The system of claim 15, wherein the assertion checker module is configured to compare the asserted behavioral expectation of the at least one microservice with an observed behavior of the at least one microservice in response to the execution of the fault injection operations by:
   accessing data associated with the observed behavior of the at least one microservice, which is persistently stored in an event log database; and
   analyzing the stored data associated with observed behavior to verify whether the observed behavior of the at least one microservice conforms to the asserted behavioral expectation of the at least one microservice.

19. The system of claim 15, wherein the test script is reusable for failure recovery testing of different distributed microservice-based applications.

20. The system of claim 15, wherein control plane provides a failure recovery testing framework that is application agnostic and independent of heterogeneous programming languages that are utilized to develop the plurality of microservices of the distributed microservice-based application.

* * * * *